(12) United States Patent
Renner

(10) Patent No.: US 11,668,380 B2
(45) Date of Patent: Jun. 6, 2023

(54) ELECTRIC VEHICLE TRANSMISSION

(71) Applicant: ZF Friedrichshafen AG, Friedrichshafen (DE)

(72) Inventor: Stefan Renner, Ludwigshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/045,924

(22) Filed: Oct. 12, 2022

(65) Prior Publication Data

US 2023/0122997 A1 Apr. 20, 2023

(30) Foreign Application Priority Data

Oct. 18, 2021 (DE) ...................... 10 2021 211 713.9

(51) Int. Cl.
  *F16H 37/08* (2006.01)
  *B60K 17/08* (2006.01)
  *B60K 7/00* (2006.01)
  *B60K 17/04* (2006.01)
  *B60K 1/00* (2006.01)

(52) U.S. Cl.
  CPC .......... *F16H 37/082* (2013.01); *B60K 17/08* (2013.01); *B60K 17/046* (2013.01); *B60K 2001/001* (2013.01); *B60K 2007/0061* (2013.01); *F16H 2200/0021* (2013.01); *F16H 2200/0039* (2013.01); *F16H 2200/201* (2013.01); *F16H 2200/2038* (2013.01)

(58) Field of Classification Search
  CPC .... B60K 1/00; B60K 17/08; B60K 2001/001; B60K 2007/0061; F16D 2023/0625; F16D 2023/0631; F16D 2023/0687; F16D 2023/0693; F16H 2200/0021; F16H 2200/0039; F16H 2200/201; F16H 2200/2038; F16H 37/082; F16H 2003/442; F16H 3/62; F16H 2200/2035
  See application file for complete search history.

(56) References Cited

U.S. PATENT DOCUMENTS

2009/0143185 A1* 6/2009 Hiramatsu ................ F16H 3/66
  475/275
2017/0036527 A1* 2/2017 Hwang .................. B60K 6/442
  (Continued)

FOREIGN PATENT DOCUMENTS

DE   10 2015 208 355 A1   11/2016
DE   10 2017 110 460 A1   11/2018
  (Continued)

OTHER PUBLICATIONS

German Patent Office, Search Report issued in German patent application No. 10 2021 211 713.9 (dated May 13, 2022).

*Primary Examiner* — Timothy Hannon
*Assistant Examiner* — Farhana Pervin
(74) *Attorney, Agent, or Firm* — Finch & Maloney PLLC

(57) ABSTRACT

An electric vehicle transmission (7) includes an input shaft (10), an output shaft (11), a first planetary gear set (P1), a second planetary gear set (P2), and a third planetary gear set (P3). The input shaft (10) is provided for coupling to an electric machine (6). A first shift element (A), a second shift element (B), and a third shift element (C) are provided at least functionally as well. Also disclosed is a drive system (4), a vehicle drive train (5), and an electric vehicle.

14 Claims, 5 Drawing Sheets

(56) References Cited

U.S. PATENT DOCUMENTS

| | | | |
|---|---|---|---|
| 2019/0344660 A1* | 11/2019 | Kumar | B60K 7/0007 |
| 2020/0262293 A1* | 8/2020 | Glückler | B60K 17/06 |
| 2020/0282827 A1* | 9/2020 | Kaltenbach | B60K 17/06 |

FOREIGN PATENT DOCUMENTS

| | | |
|---|---|---|
| DE | 10 2017 006 262 A1 | 1/2019 |
| WO | 2019/007723 A1 | 1/2019 |

* cited by examiner

|    | I (A) | II (B) | III (C) | i    | phi  |
|----|-------|--------|---------|------|------|
| G1 | x     |        |         | 30,5 |      |
| G2 |       | x      |         | 17,0 | 1,83 |
| G3 |       |        | x       | 9,0  | 1,86 |

Fig. 5

ELECTRIC VEHICLE TRANSMISSION

RELATED APPLICATIONS

This application claims the benefit of and right of priority under 35 U.S.C. § 119 to German Patent Application no. 10 2021 211 713.9, filed 18 Oct. 2021, the contents of which are incorporated herein by reference in its entirety.

FIELD OF THE DISCLOSURE

The invention relates to an electric vehicle transmission comprising an input shaft, an output shaft and a first planetary gear set, a second planetary gear set and a third planetary gear set, wherein the input shaft is provided for coupling to an electric machine, wherein the first planetary gear set, the second planetary gear set and the third planetary gear set each comprise a first element, a second element and a third element in the form of one respective sun gear, one respective planet spider and one respective ring gear, wherein a first shift Element, a second shift element and a third shift element are provided at least functionally, and wherein the first element of the first planetary gear set is connected in a rotationally fixed manner to the input shaft. The invention also relates to a drive system, a vehicle drive train and an electric vehicle.

BACKGROUND

In electric vehicles, an electric vehicle transmission is sometimes provided in a respective drive train between a respective electric machine and driving wheels of the electric vehicle, in particular in order to implement a speed reduction ratio for a drive movement of the electric machine to the driving wheels. In addition to single-speed electric vehicle transmissions, transmissions in which two or more gears can be shifted are frequently used in electric commercial vehicles as well.

DE 10 2017 006 262 A1 describes an electric vehicle transmission intended for use in an electric vehicle. In addition to an input shaft and an output shaft, this electric vehicle transmission comprises three planetary gear sets, each of which is composed of elements in the form of one respective sun gear, one respective planet spider and one respective ring gear. In the installed state of the electric vehicle transmission, the input shaft serves as a connection to an upstream electric machine. The electric vehicle transmission further includes three shift elements, which are configured as force-locking shift elements and can be selectively actuated to realize a guidance of the power flow from the input shaft via the planetary gear sets to the output shaft with different transmission ratios.

SUMMARY

Proceeding from the above-described prior art, it is now the object of the present invention to create an electric vehicle transmission in which different gears for integrating an electric machine can be realized in the most advantageous way possible.

This object is achieved by embodiments disclosed herein. Advantageous further developments will be apparent in light of the present disclosure, including a drive system comprising an electric vehicle transmission, a vehicle drive train, and an electric vehicle comprising such a vehicle drive train.

According to the invention, an electric vehicle transmission comprises an input shaft, an output shaft and a first planetary gear set, a second planetary gear set and a third planetary gear set, wherein the input shaft is provided for coupling to an electric machine. The first planetary gear set, the second planetary gear set and the third planetary gear set each comprise a first element, a second element and a third element in the form of one respective sun gear, one respective planet spider and one respective ring gear. A first shift element, a second shift element and a third shift element are furthermore provided at least functionally, whereby the input shaft can preferably be coupled to the output shaft via the planetary gear sets by a respective actuation of said shift elements while shifting a respective gear. The first element of the first planetary gear set is connected in a rotationally fixed manner to the input shaft.

In the context of the invention, a "shaft" is understood to be a rotatable component of the transmission, via which a power flow can be guided between components, possibly with simultaneous actuation of a corresponding shift element. The respective shaft can connect components to one another axially or radially or even both axially and radially. The respective shaft can therefore also be present as an intermediate piece, via which a respective component is connected, for example, radially.

In the context of the invention, the term "axial" means an orientation in the direction of a longitudinal central axis of the transmission, parallel to which axes of rotation of rotatable components of the transmission, in particular the shafts of the transmission and the elements of the planetary gear sets, are disposed. "Radial" is then understood to mean an orientation in the diameter direction of a respective component of the transmission.

In the electric vehicle transmission according to the invention, the input shaft is provided to produce a drive-side coupling to an electric machine. For this purpose, the input shaft is in particular equipped with a connection point, at which a coupling of the input shaft to a rotor of the electric machine can be configured. In the installed state of the electric vehicle transmission, this coupling between the electric machine and the input shaft is configured such that there is always a fixed speed ratio between a rotational speed of the input shaft of the electric vehicle transmission and a rotational speed of the rotor of the electric machine. In the context of the invention, therefore, at least one further transmission stage, such as a spur gear stage and/or a planetary gear stage, can potentially be provided between the input shaft and the rotor of the electric machine, through which a pre-transmission of a rotational movement of the rotor of the electric machine to the input shaft can be realized. Particularly preferably, however, a rotationally fixed connection of the rotor of the electric machine is produced at the input shaft of the electric vehicle transmission according to the invention, so that the rotor and the input shaft rotate at the same speed during operation.

In the electric vehicle transmission according to the invention, the input shaft and the output shaft are in particular disposed coaxially with respect to one another, whereby the planetary gear sets are further preferably also positioned coaxially with respect to the input shaft and the output shaft. This makes it possible to realize a particularly compact structure of the electric vehicle transmission in the radial direction.

The planetary gear sets are each composed of a first element, a second element and a third element, whereby the elements of the individual planetary gear set are formed by a respective sun gear, a respective planet spider and a respective ring gear. The individual planetary gear set is particularly preferably a minus planetary gear set, in which the respective planet spider guides at least one planetary gear in a rotatably mounted manner, whereby the at least one planetary gear is in mesh with both the respective sun gear and the respective ring gear. In one design of the respective planetary gear set as a minus planetary gear set, the first element is in particular the sun gear, the second element is the planet spider and the third element is the ring gear.

Alternatively, one or more of the planetary gear sets could in principle also be configured as a plus planetary gear set. In this case then, at least one planetary gear pair is rotatably mounted in the respective planet spider, one planetary gear of which is in mesh with the respective sun gear and one planetary gear is in mesh with the respective ring gear. In addition, the planetary gears of the at least one planetary gear pair mesh with one another. In contrast to a design as a minus planetary gear set, the first element of the respective planetary gear set is then preferably the sun gear, the second element of the respective planetary gear set is the ring gear, and the third element of the respective planetary gear set is the planet spider. In comparison to a design as a minus planetary gear set, a stationary transmission ratio of the respective planetary gear set must also be increased by one. As already described above, however, in the context of the invention, all planetary gear sets are preferably designed as minus planetary gear sets. The first planetary gear set in particular has a stationary transmission ratio of −2.2, the second planetary gear set preferably has a stationary transmission ratio of −2.5, and the third planetary gear set in particular has a stationary transmission ratio of −2.5. Further preferably, exactly three planetary gear sets are provided in the electric vehicle transmission according to the invention.

The electric vehicle transmission according to the invention also at least functionally comprises three shift elements which, when actuated, preferably effect the realization of a respective associated gear between the input shaft and the output shaft. In each of the gears, a power flow is guided from the input shaft via the planetary gear sets to the output shaft. Particularly preferably, exactly three gears which differ in terms of the transmission ratio can be realized between the input shaft and the output shaft.

In the context of the invention, a first shift element, a second shift element and a third shift element being provided "at least functionally" means that at least the function of these three shift elements is produced in the electric vehicle transmission according to the invention. The three shift elements can actually be physically present as individual shift elements, or their function can be produced by another component, such as a shifting device that combines the function of two or more shift elements.

The invention now includes the technical teaching that the second element of the first planetary gear set and the first element of the third planetary gear set are connected to one another in a rotatably fixed manner. The third element of the first planetary gear set and the first element of the second planetary gear set are furthermore connected to one another in a rotatably fixed manner, whereas the second element of the second planetary gear set is fixed. The third element of the third planetary gear set is likewise fixed as well, whereas the second element of the third planetary gear set is connected in a rotatably fixed manner to the output shaft. The third element of the second planetary gear set can be connected in a rotatably fixed manner via the first shift element to the second element of the first planetary gear set and the first element of the third planetary gear set, whereby the third element can also be connected in a rotatably fixed manner via the second shift element to the output shaft. The output shaft can furthermore be connected in a rotationally fixed manner via the third shift element to the third element of the first planetary gear set and the first element of the second planetary gear set.

In the electric vehicle transmission according to the invention, the first element of the first planetary gear set is connected to the input shaft in a permanently rotationally fixed manner, as a result of which the input shaft and the first element of the first planetary gear set always rotate at the same speed. The second element of the first planetary gear set and the first element of the third planetary gear set are also connected to one another in a permanently rotationally fixed manner, so that the second element of the first planetary gear set and the first element of the third planetary gear set always rotate at the same rotational speed. Similarly, the third element of the first planetary gear set and the first element of the second planetary gear set are connected to one another in a permanently rotationally fixed manner as well, as a result of which the third element of the first planetary gear set and the first element of the second planetary gear set also permanently rotate at the same rotational speed. Furthermore, both the second element of the second planetary gear set and the third element of the third planetary gear set are permanently fixed and are thus permanently prevented from rotating. The second element of the third planetary gear set is connected to the output shaft in a permanently rotationally fixed manner, as a result of which the output shaft and the second element of the third planetary gear set always rotate at the same speed.

In the context of the invention, the respective permanently rotationally fixed connections are preferably implemented via intermediate shafts, which can be in one or more parts. In the context of the invention, a configuration is also possible in which the respective shaft is designed in one piece with one or even both of the components connected to it in a rotationally fixed manner, whereby the latter is in particular realized when the permanently connected components are disposed in close proximity to one another.

For permanent fixing, the respective element of the electric vehicle transmission is in particular connected in a rotationally fixed manner to a permanently fixed component, which can be a transmission housing of the electric vehicle transmission, a part of the transmission housing or a component connected in a rotationally fixed manner to said housing. The respective element of the electric vehicle transmission can optionally also be designed in one piece with the permanently fixed component.

Closing the first shift element produces a rotationally fixed connection between the third element of the second planetary gear set and the second element of the first planetary gear set and the first element of the third planetary gear set, as a result of which the third element of the second planetary gear set and the second element of the first planetary gear set as well as the first element of the third planetary gear set rotate together. On the other hand, if the second shift element is brought into a closed state, the third element of the second planetary gear set is connected in a rotationally fixed manner to the output shaft and thus also to the second element of the third planetary gear set, so that the third element of the second planetary gear set, the second element of the third planetary gear set and the output shaft rotate at the same speed. Actuating the third shift element, however, results in a rotationally fixed connection of the output shaft and thus also of the second element of the third planetary gear set with the third element of the first planetary gear set and the first element of the second planetary gear set. The output shaft, the second element of the third planetary gear set, the third element of the first planetary gear set and the first element of the second planetary gear set thus rotate at the same speed after actuation of the third shift element.

The design according to the invention of an electric vehicle transmission has the advantage that different gears can be shifted between the input shaft and the output shaft by the individual actuation of the at least functionally present shift elements, as a result of which a drive movement of an electric machine can also be transmitted with different transmission ratios when the electric vehicle transmission is installed. This makes it possible to achieve a suitable spread of the electric vehicle transmission for integrating the electric machine, which is in particular designed as a high-speed machine, via the different gears. Actuation of the third shift element also causes the second planetary gear set to rotate without load, because the third element of the second planetary gear set is now completely decoupled. As a result, there are no rotational losses at the second planetary gear set. The permanently fixed state of both the second element of the second planetary gear set and the third element of the third planetary gear set also means that there is no need for bearings in these areas, which reduces production costs. This is also advantageous in terms of the supply of lubricant to components, in particular the planetary gears of the planetary gear sets.

The at least functionally present shift elements are particularly preferably designed as form-locking shift elements, whereby they are in particular configured as unsynchronized claw shift elements. A design of the shift elements as form-locking shift elements has the advantage that, when the respective shift element is open, there is little or no drag loss at the respective shift element. This makes it possible to improve the efficiency of the electric vehicle transmission. In the context of the invention, however, one or more of the shift elements can also be configured as force-locking shift elements, in which case they can particularly preferably be in the form of lamellar shift elements. This advantageously allows the respective shift element to be actuated under load. One or more shift elements can also be designed as form-locking shift elements in the form of locking synchronizers.

According to one embodiment of the invention, the first shift element, the second shift element and the third shift element are formed by a common shifting device, the coupling element of which can respectively be placed into a first shift position, a second shift position and a third shift position. In the first shift position, the coupling element functionally produces an actuated state of the first shift element by connecting the third element of the second planetary gear set in a rotationally fixed manner to the second element of the first planetary gear set and the first element of the third planetary gear set. In the second shift position of the shifting device, the coupling element functionally produces an actuated state of the second shift element (B), for which purpose the coupling element connects the third element of the second planetary gear set in a rotationally fixed manner to the output shaft. In the third shift position, the coupling element functionally produces an actuated state of the third shift element (C) and connects the output shaft in a rotationally fixed manner to the third element of the first planetary gear set and the first element of the second planetary gear set. The functions of the three shift elements can thus advantageously be produced by a common shifting device, which enables a compact structure of the electric vehicle transmission and also reduces production costs. The coupling element that produces the respective rotationally fixed connections is preferably disposed in a space-saving manner above an element designed as a ring gear of one of the planetary gear sets. In addition to the shift positions, the coupling element can in particular also be placed into one or more neutral positions in which none of the rotationally fixed connections are produced.

In further development of the aforementioned embodiment, the coupling element is guided in a rotationally fixed and axially displaceable manner between the shift positions. The guidance of the coupling element between the first and the second shift position on a first gearing of the coupling element is carried out on a gearing which is connected in a rotationally fixed manner to the third element of the second planetary gear set, whereas the guidance of the coupling element between the second and the third shift position on a second gearing of the coupling element takes place on a gearing which is connected in a rotationally fixed manner to the output shaft. The coupling element is thus guided using different gearings as the basis depending on its axial position, which then realizes a respective rotationally fixed and axially displaceable guidance.

Upon displacement into the respective shift position, a rotationally fixed connection with the component or components to be connected in a rotationally fixed manner is preferably also produced on the gearing of the coupling element on which there is currently no axial guidance of the coupling element between the shift positions. In the first shift position, therefore, the coupling element engages with the second gearing in a gearing which is connected in a rotationally fixed manner to the second element of the first planetary gear set and the first element of the third planetary gear set. Similarly, in the second shift position, a meshing engagement is produced on the second gearing with the gearing that is connected to the output shaft in a permanently rotationally fixed manner. On the other hand, when shifting to the third shift position, the first gearing is in mesh with a gearing which is connected in a rotationally fixed manner to the third element of the first planetary gear set and the first element of the second planetary gear set.

The coupling element is preferably designed like a gear shift sleeve, whereby the gearings are in particular configured on an inner perimeter of the gear shift sleeve. Overall, this results in a shifting device in which the respective rotationally fixed connections can be configured in a form-locking manner.

Alternatively, or in addition to the above-described variants, the coupling element is assigned an adjusting actuator via which the coupling element can be moved between the shift positions. In the context of the invention, this adjusting actuator is preferably configured as an electromechanical adjusting actuator, but it can also be a pneumatic or hydraulic adjusting actuator.

According to one possible configuration of the invention, the output shaft is coupled to a differential gear. This differential gear is in particular an interaxle differential, which is further preferably designed as a bevel gear differential. The interaxle differential is preferably used to distribute a drive movement transmitted to the output shaft of the electric vehicle transmission to output shafts of a drive axle of the electric vehicle. The output shaft of the differential gear is in particular coupled to a differential cage of the differential gear, whereby this coupling can be implemented in that the output shaft is connected in a rotationally fixed manner to the differential cage or carries a spur gear which is in mesh with a drive ring gear of the differential cage. The differential gear can furthermore also be a longitudinal differential, via which a drive power is distributed to a plurality of drive axles.

According to one embodiment of the invention, the planetary gear sets are disposed on a connection point of the input shaft which serves to couple the input shaft to the electric machine in a sequence first planetary gear set, second planetary gear set and third planetary gear set. This makes it possible to achieve a suitable structure of the electric vehicle transmission according to the invention. In the context of the invention, however, the planetary gear sets can also be disposed differently in axial direction following the connection point of the input shaft. In further development of the aforementioned embodiment, the first shift element, the second shift element and the third shift element are also disposed axially between the second planetary gear set and the third planetary gear set. If the three shift elements are formed by a common shifting device, this shifting device is preferably disposed axially between the second planetary gear set and the third planetary gear set.

In the electric vehicle transmission according to the invention, a first gear between the input shaft and the output shaft results by closing the first shift element, whereas a second gear between the input shaft and the output shaft can be shifted by actuating the second shift element. Lastly, a third gear between the input shaft and the output shaft can be realized by closing the third shift element. This advantageously achieves a suitable realization of gears of the electric vehicle transmission by means of appropriate guidance of the power flow via the three planetary gear sets, whereby a suitable integration of an electric machine, which is in particular designed here as a high-speed machine, is accomplished in each of the individual gears.

Another subject matter of the invention is a drive system for an electric vehicle in which an electric vehicle transmission according to one or more of the above-described variants is provided in addition to an electric machine. A rotor of the electric machine is coupled to the input shaft of the electric vehicle transmission, whereby this coupling is in particular present as a rotationally fixed connection between the rotor of the electric machine and a connection point of the input shaft. Alternatively, however, one or more intermediate transmission stages, which could specifically be designed as a spur gear stage or as a planetary gear stage, could be provided between the input shaft of the electric vehicle transmission and the rotor of the electric machine.

The electric machine of the drive system according to the invention can in particular be operated as an electric motor or as a generator to generate a drive movement to drive the electric vehicle in the first case, while being able to brake the electric vehicle via the electric machine in the second case (recuperation). The electric machine is particularly preferably designed as a high-speed electric machine.

In further development of a drive system according to the invention, the first planetary gear set of the electric vehicle transmission is disposed such that it axially overlaps and lies radially inward of the electric machine. This makes it possible to achieve a nested structure of the drive system, which results overall in an axially compact structure.

A drive system designed in accordance with one or more of the aforementioned variants is in particular part of a vehicle drive train provided for an electric vehicle. The drive system is preferably disposed parallel to a drive axle, wherein the output shaft of the electric vehicle transmission is coupled to output shafts of the drive axle. This advantageously makes it possible to achieve a compact structure of a drive axle with the drive system, whereby the coupling between the output shaft of the electric vehicle transmission and the output shafts of the drive axle are in particular implemented via a differential gear. The drive system is also in particular disposed above the drive axle.

In the context of the invention, such a vehicle drive train is preferably provided in an electric vehicle, which is in particular an electric commercial vehicle. The electric vehicle can in particular be an electrically driven van.

In the context of the invention, two components of the electric vehicle transmission being "connected" or "coupled" or "connected to one another" in a rotationally fixed manner means that said components are permanently coupled, so that they cannot rotate independently of one another. Therefore, no shift element is provided between these components, which can be elements of the planetary gear sets and/or shafts and/or a rotationally fixed component of the transmission; the corresponding components are instead coupled to one another at a fixed speed ratio.

On the other hand, if a shift element is at least functionally provided between two components, these components are not coupled to one another in a permanently rotationally fixed manner; a rotationally fixed coupling will instead only be carried out by actuating the at least functionally intermediate shift element. In the context of the invention, actuating the shift element means that the relevant shift element is brought into a closed state and consequently synchronizes the rotational movements of the components directly coupled to it. If the shift element in question is configured as a form-locking shift element, the components which are directly connected to one another in a rotationally fixed manner via said shift element will rotate at the same speed, whereas, if the shift element in question is force-locking, rotational speed differences between the components can remain even after said shift element has been actuated. This intended or even unintended state is nonetheless referred to in the context of the invention as a rotationally fixed connection of the respective components via the shift element.

The invention is not limited to the stated combination of the features of the main claim or the claims dependent thereon. Individual features can also be combined with one another, including those that emerge from the claims, the following description of preferred embodiments of the invention or directly from the drawings. References in the claims to the drawings by means of reference signs is not intended limit the scope of protection of the claims.

BRIEF DESCRIPTION OF THE DRAWINGS

Advantageous embodiments of the invention, which are discussed in the following, are shown in the drawings. The figures show:

FIG. 5: an example of a circuit diagram of the electric vehicle transmission of the drive train of FIGS. 2 to 4.

DETAILED DESCRIPTION

Figure 1:
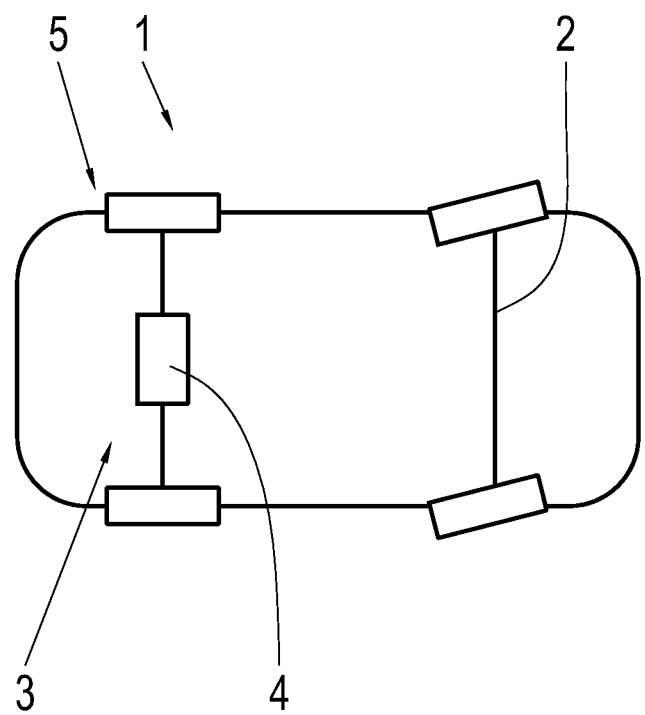
FIG. 1: a schematic illustration of an electric vehicle according to a preferred embodiment of the invention.

FIG. 1 shows a schematic view of an electric vehicle 1, which is in particular an electric commercial vehicle, such as a van. In addition to a steerable, non-driven vehicle axle 2, the electric vehicle 1 also comprises a drive axle 3 which, together with a drive system 4, is part of a vehicle drive train 5. Whereas the vehicle axle 2 is a front axle of the electric vehicle 1, the drive axle 3 is a rear axle of the electric vehicle 1. Alternatively, or in addition to the drive axle 3, however, the vehicle axle 2 could be designed as a driven axle as well.

Figure 2:
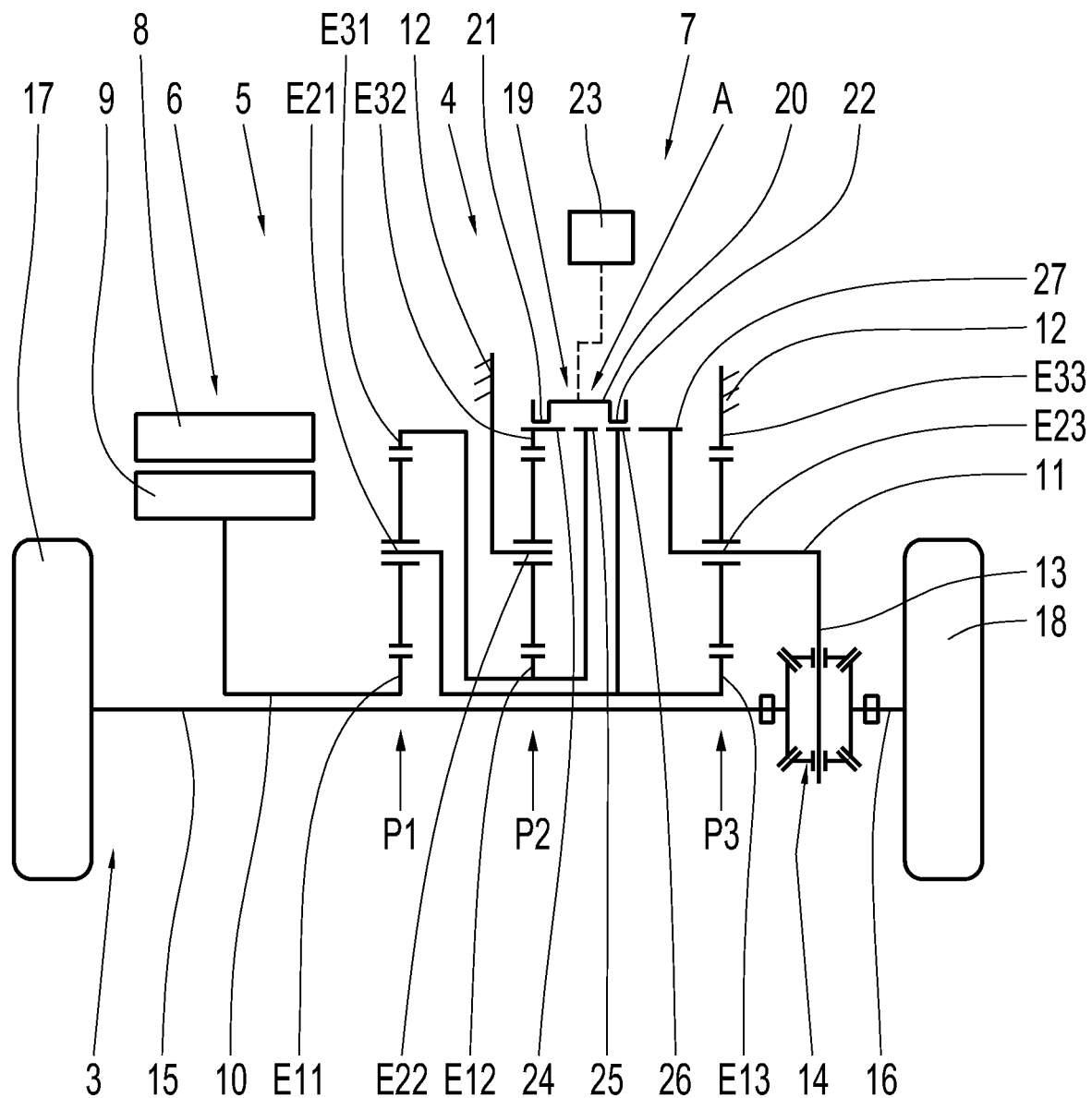
FIG. 2: a schematic view of a drive train of the electric vehicle of FIG. 1, shown in a first shift state of an electric vehicle transmission.
Figure 3:
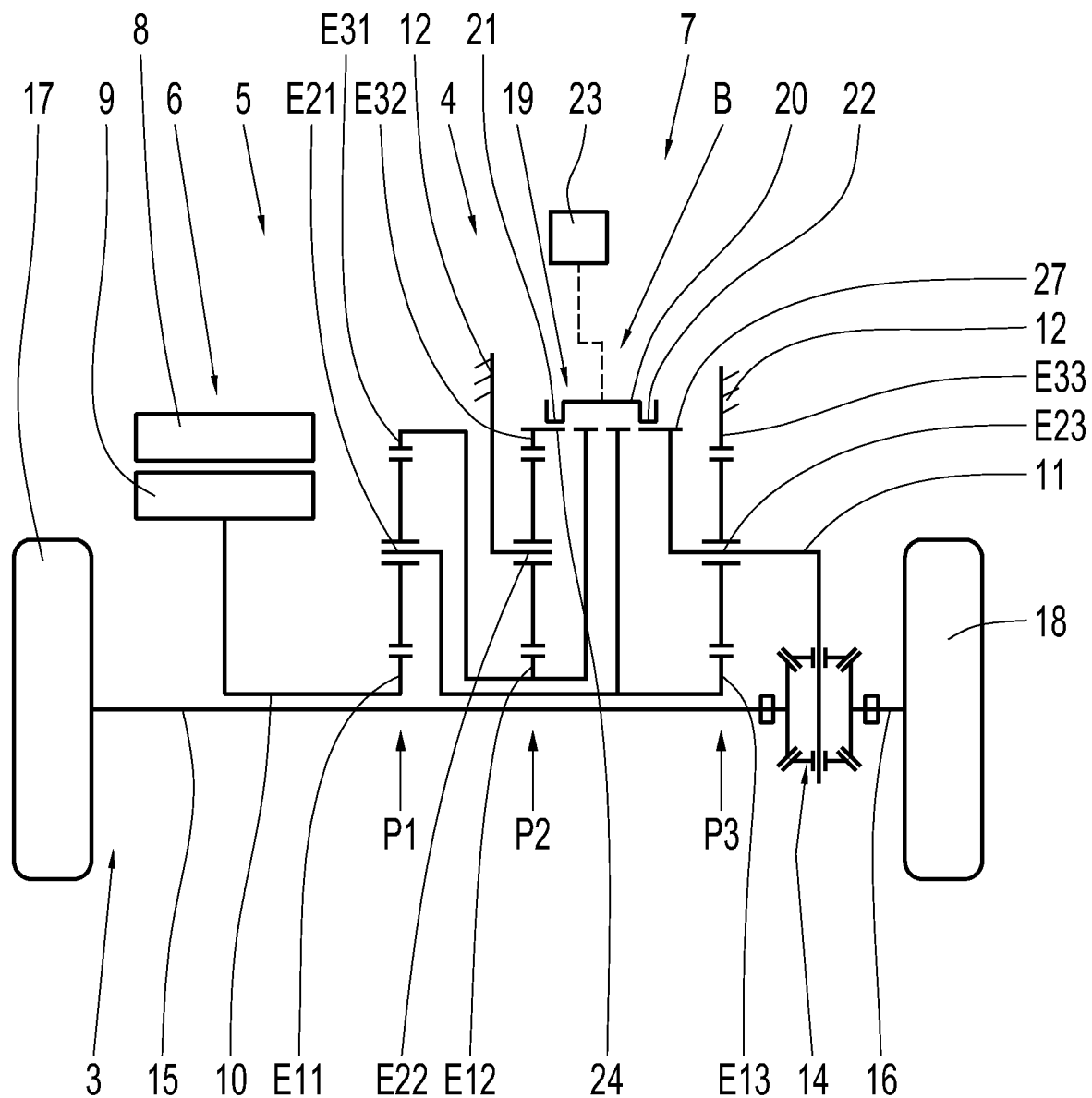
FIG. 3: a schematic illustration of the drive train of FIG. 2, shown in a second shift state of the electric vehicle transmission.
Figure 4:
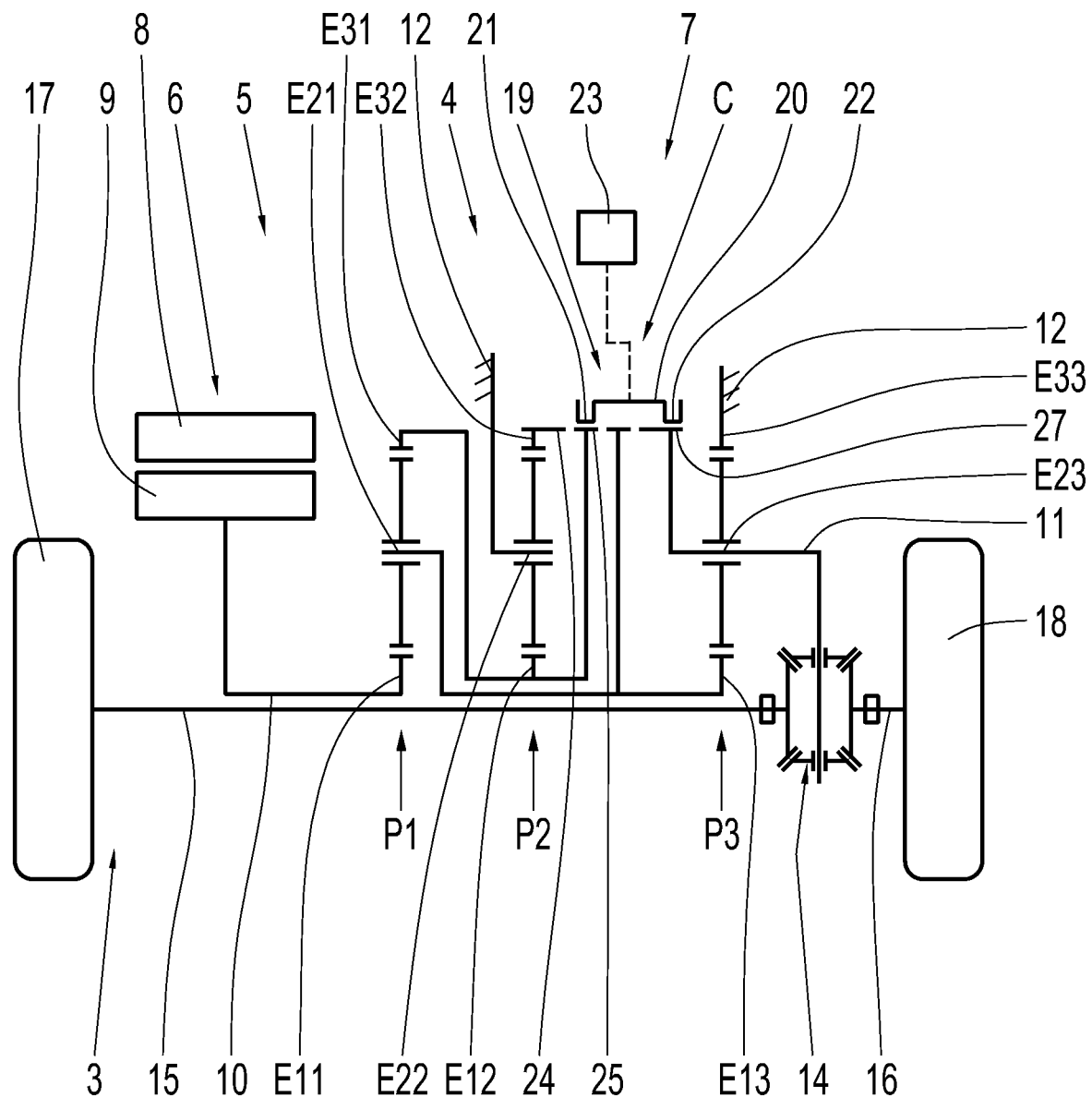
FIG. 4: a schematic view of the drive train of FIG. 2, shown in a third shift state of the electric vehicle transmission.

FIGS. 2 to 4 respectively now show the vehicle drive train 5 in the region of the drive axle 3 in more detail, whereby the vehicle drive train 5 is implemented according to a preferred possible configuration of the invention. As can be seen here, the drive system 4 is composed of an electric machine 6 and an electric vehicle transmission 7, which is configured according to a preferred embodiment of the invention. The electric machine 6 is formed by a stator 8 and a rotor 9 in a manner known in principle to those skilled in the art, whereby the electric machine 6 can be operated either as a generator or as an electric motor.

In addition to an input shaft 10 and an output shaft 11, the electric vehicle transmission 7 comprises three planetary gear sets P1, P2 and P3, each of which is composed of one respective first element E11 or E12 or E13, one respective second element E21 or E22 or E23 and one respective third element E31 or E32 or E33. The respective first element E11 or E12 or E13 of the respective planetary gear set P1 or P2 or P3 is a respective sun gear, while the respective second element E21 or E22 or E23 of the respective planetary gear set P1 or P2 or P3 is designed as a respective planet spider. The respective third element E31 or E32 or E33 of the respective planetary gear set P1 or P2 or P3 is furthermore a respective ring gear of the respective planetary gear set P1 or P2 or P3.

At least one planetary gear, which is in mesh with both the respective sun gear and the respective ring gear of the respective planetary gear set P1 or P2 or P3, is rotatably mounted in each of the respective planet spiders of the respective planetary gear set P1 or P2 or P3. The planetary gear sets P1, P2 and P3 are therefore designed here as minus planetary gear sets. A stationary transmission ratio of the first planetary gear set P1 is in particular −2.2, while both the second planetary gear set P2 and the third planetary gear set P3 preferably each have a stationary transmission ratio of −2.5.

A design of one or more of the planetary gear sets P1 to P3 as a plus planetary gear set is also possible in the context of the invention, however, for which purpose, compared to the respective design as a minus planetary gear set, the respective second element E21 or E22 or E23 must be formed by the respective ring gear and the respective third element E31 or E32 or E33 by the respective planet spider. When the respective planetary gear set is designed as a plus planetary gear set, a stationary transmission ratio must furthermore be increased by one compared to a design as a minus planetary gear set. In a plus planetary gear set, at least one planetary gear pair is rotatably mounted in the respective planet spider and one of the planetary gears of said gear pair is in mesh with the respective sun gear and one is in mesh with the respective ring gear. The planetary gears of the at least one planetary gear pair are also in mesh with one another.

In the present case, the first element E11 of the first planetary gear set P1 is connected in a rotationally fixed manner to the input shaft 10, which is moreover connected in a rotationally fixed manner to the rotor 9 of the electric machine 6. The first element E11 of the first planetary gear set P1 and the rotor 9 are therefore likewise connected to one another in a rotationally fixed manner via the input shaft 10, as a result of which the first element E11 and the rotor 9 always rotate at the same speed. In the context of the invention, the first element E11 of the first planetary gear set P1 can be configured in one piece with the input shaft 10.

The second element E21 of the first planetary gear set P1 is connected in a permanently rotationally fixed manner to the first element E13 of the third planetary gear set P3, so that these two elements E21 and E13 also constantly rotate at the same speed. The third element E31 of the first planetary gear set P1 and the first element E12 of the second planetary gear set P2 are likewise also connected to one another in a permanently rotationally fixed manner and thus permanently rotate together. The respective rotationally fixed connection is preferably made via an intermediate shaft.

As can further be seen in FIG. 2, the second element E22 of the second planetary gear set P2 is fixed to a rotationally fixed component 12 and is thus permanently prevented from rotating. The rotationally fixed component 12 is preferably a transmission housing of the electric vehicle transmission 7, a part of such a transmission housing or a component connected in a rotationally fixed manner to said housing. The third element E33 of the third planetary gear set P3 is also permanently fixed to the rotationally fixed component 12, as a result of which the third element E33, too, is permanently prevented from rotating. The second element E23 of the third planetary gear set P3, on the other hand, is connected in a rotationally fixed manner to the output shaft 11 of the electric vehicle transmission 7, as a result of which the second element E23 permanently rotates together with the output shaft 11. The second element E23 of the third planetary gear set P3 can be configured in one piece with the output shaft 11 as well.

In addition to the second element E23 of the third planetary gear set P3, the output shaft 11 is also connected in a permanently rotationally fixed manner to a differential cage 13 of a differential gear 14. This differential gear 14 is designed as a bevel gear differential, which distributes a drive power introduced via the output shaft 11 into the differential cage 13 to output shafts 15 and 16 of the drive axle 3 in a manner known in principle to those skilled in the art. One respective driving wheel 17 or 18 of the drive axle 3 is drivingly connected to each of the output shafts 15 and 16.

The electric vehicle transmission 7 according to the invention furthermore comprises a shifting device 19 in which a coupling element 20 in the form of a sliding sleeve is provided. This coupling element 20 is provided radially surrounding the ring gear of the second planetary gear set P2 and is equipped on an inner perimeter with both a gearing 21 and a gearing 22, whereby the two gearings 21 and 22 are configured on the coupling element 20 axially one behind the other.

The coupling element 20 can be moved by means of an associated adjusting actuator 23 between three different shift positions, which are shown in detail in FIGS. 2 to 4. A meshing engagement can be produced at the gearing 21 with either a gearing 24 or a gearing 25 depending on the axial position, whereby the gearing 24 is connected in a rotationally fixed manner to the third element E32 of the second planetary gear set P2, while the gearing 25 is connected in a rotationally fixed manner to the third element E31 of the first planetary gear set P1 and the first element E12 of the second planetary gear set P2. Likewise depending on the axial position, a meshing engagement can be realized at the gearing 22 with a gearing 26 or a gearing 27, of which the gearing 26 is connected in a rotationally fixed manner to the second element E21 of the first planetary gear set P1 and the first element E13 of the third planetary gear set P3, while the gearing 27 is connected in a rotationally fixed manner to the output shaft 11.

The shifting device 19 produces the function of three shift elements A, B and C, the respective actuated state of which are realized by the shifting device 19 in one of its shift states. FIG. 2 thus shows a first shift state of the shifting device 19, in which the shifting device 19 produces the actuated state of the first shift element A, whereby, in this first shift state, the gearing 21 is guided in a rotationally fixed manner on the gearing 24 and the meshing engagement with the gearing 26 is produced at the gearing 22. In this case, therefore, a rotationally fixed connection of the third element E32 of the second planetary gear set P2 with the second element E21 of the first planetary gear set P1 and the first element E13 of the third planetary gear set P3 is configured via the coupling element 20.

Proceeding from the first shift state shown in FIG. 2, the coupling element 20 of the shifting device 19 can be displaced axially by means of the adjusting actuator 23 into a second shift position, which is shown in FIG. 3. This axial displacement takes place by guiding the coupling element 20 at its gearing 21 on the gearing 24. The second shift position corresponds to an actuated state of the second shift element B. In the second shift position, in addition to the meshing engagement of the gearing 21 with the gearing 24, the gearing 22 is now in mesh with the gearing 27, as a result of which the third element E32 of the second planetary gear set P2 is now connected in a rotationally fixed manner to the output shaft 11 via the coupling element 20.

From the second shift position, the coupling element 20 can, in addition to a return movement into the first shift position, also be brought axially into a third shift position, in which case the coupling element 20 is guided at the gearing 22 on the gearing 27. In the third shift position, a meshing engagement with the gearing 25 is produced on the gearing 21, so that the third element E31 of the first planetary gear set P1 and the first element E12 of the second planetary gear set P2 are now connected in a rotationally fixed manner to the output shaft 11 by means of the coupling element 20. Since the third element E32 of the second planetary gear set P2 is also decoupled, the second planetary gear set P2 now rotates without load. The actuated state of the third shift element C is produced by the third shift position of the coupling element 20.

The drive system 4 in the present case is disposed parallel to the drive axle 3 and thus axially between the driving wheels 17 and 18. The electric machine 6 is disposed axially adjacent to the driving wheel 17, whereby the first planetary gear set P1 of the electric vehicle transmission 7 can be positioned axially at the level of and radially inward of the stator 8 of the electric machine 6. The first planetary gear set P1 is then followed axially first by the second planetary gear set P2 and then by the planetary gear set P3 and the differential gear 14, whereby the latter can be accommodated in a transmission housing of the electric vehicle transmission 7 together with the planetary gear sets P1 to P3. The shifting device 19 is disposed axially between the second planetary gear set P2 and the third planetary gear set P3.

Lastly, FIG. 5 shows an example of a circuit diagram of the electric vehicle transmission 7 of FIGS. 2 to 4. It can be seen that a first gear G1, a second gear G2 and a third gear G3 can be shifted in the electric vehicle transmission 7, whereby an X in the table in FIG. 5 indicates which shift position I, II or III of the shifting device 19 must be realized in each case. Each of the shift positions I to III also has assigned to it in brackets which function of which of the shift elements A, B and C is respectively being produced. The table in FIG. 5 furthermore shows a respective gear ratio i in the respective gear G1 or G2 or G3 and a gear step phi, whereby this gear ratio i and this gear step phi are achieved when the planetary gear sets P1 to P3 are designed with the preferred stationary transmission ratios.

The first gear G1 results between the input shaft 10 and the output shaft 11 in the shift position I of the shifting device 19, as shown in FIG. 2. The coupling element 20 of the shifting device 19 therefore connects the third element E32 of the second planetary gear set P2 in a rotationally fixed manner to the second element E21 of the first planetary gear set P1 and the first element E13 of the third planetary gear set P3 to realize the gear G1. As indicated in FIG. 5 and already described with respect to FIG. 2, this corresponds to an actuated state of the shift element A formed by the shifting device 19.

To shift the second gear G2, on the other hand, the shift position II of the shifting device 19 must be set, in which the coupling element 20 connects the third element E32 of the second planetary gear set P2 in a rotationally fixed manner to the output shaft 11. This shift state II is shown in FIG. 3 and constitutes an actuated state of the shift element B.

Lastly, the third gear G3 of the electric vehicle transmission 7 is shifted by bringing the shifting device 19 into the shift position III, as shown in FIG. 4. As already described with respect to FIG. 4, in this shift position III, the coupling element 20 connects the third element E31 of the first planetary gear set P1 and the first element E12 of the second planetary gear set P2 in a rotationally fixed manner to the output shaft 11. Since the third element E32 of the second planetary gear set P2 is also completely decoupled, the second planetary gear set P2 rotates without load in the third gear G3 and thus generates no rotational losses.

With the configuration of an electric vehicle transmission according to the invention, it is thus possible to advantageously implement three different gears for integrating an electric machine.

LIST OF REFERENCE NUMERALS

1 Electric vehicle
2 Vehicle axle
3 Drive axle
4 Drive system
5 Vehicle drive train
6 Electric machine
7 Electric vehicle transmission
8 Stator
9 Rotor
10 Input shaft
11 Output shaft
12 Rotationally fixed component
13 Differential cage
14 Differential gear
15 Output shaft
16 Output shaft
17 Driving wheel
18 Driving wheel
19 Shifting device
20 Coupling element
21 Gearing
22 Gearing
23 Adjusting actuator
24 Gearing 25 Gearing
26 Gearing
27 Gearing
P1 First planetary gear set
P2 Second planetary gear set
P3 Third planetary gear set
E11 First element first planetary gear set
E21 Second element first planetary gear set
E31 Third element first planetary gear set
E12 First element second planetary gear set
E22 Second element second planetary gear set
E32 Third element second planetary gear set
E13 First element third planetary gear set
E23 Second element third planetary gear set
E33 Third element third planetary gear set
A Shift element
B Shift element
C Shift element
G1 First gear
G2 Second gear
G3 Third gear
I Shift state
II Shift state
III Shift state
i Gear ratio
phi Gear step

The invention claimed is:

1. An electric vehicle transmission, comprising:
an input shaft configured to be coupled to an electric machine;
an output shaft;
a first planetary gear set;
a second planetary gear set; and
a third planetary gear set;
wherein:
the first planetary gear set, the second planetary gear set and the third planetary gear set each comprise a first element, a second element and a third element in the form of one respective sun gear, one respective planet spider, and one respective ring gear, wherein a first shift element, a second shift element, and a third shift element are provided at least functionally, and wherein the first element of the first planetary gear set is connected in a rotationally fixed manner to the input shaft;
the second element of the first planetary gear set and the first element of the third planetary gear set are connected to one another in a rotationally fixed manner;
the third element of the first planetary gear set and the first element of the second planetary gear set are connected to one another in a rotationally fixed manner;
the second element of the second planetary gear set is fixed;
the third element of the third planetary gear set is fixed;
the second element of the third planetary gear set is connected in a rotationally fixed manner to the output shaft;
the third element of the second planetary gear set can be connected in a rotationally fixed manner via the first shift element to the second element of the first planetary gear set and to the first element of the third planetary gear set, and can be connected in a rotationally fixed manner via the second shift element to the output shaft; and the output shaft can be connected in a rotationally fixed manner via the third shift element to the third element of the first planetary gear set and the first element of the second planetary gear set.

2. The electric vehicle transmission according to claim 1, wherein the first shift element, the second shift element and the third shift element are formed by a common shifting device, a coupling element of which can respectively be placed into a first shift position, a second shift position and a third shift position;
wherein in the first shift position the coupling element functionally produces an actuated state of the first shift element and connects the third element of the second planetary gear set in a rotationally fixed manner to the second element of the first planetary gear set and the first element of the third planetary gear set;
wherein in the second shift position the coupling element functionally represents an actuated state of the second shift element and connects the third element of the second planetary gear set in a rotationally fixed manner to the output shaft; and
wherein in the third shift position the coupling element functionally produces an actuated state of the third shift element and connects the output shaft in a rotationally fixed manner to the third element of the first planetary gear set and the first element of the second planetary gear set.

3. The electric vehicle transmission according to claim 2, wherein the coupling element is guided in a rotationally fixed and axially displaceable manner between the first, second, and third shift positions; and
wherein the guidance of the coupling element between the first shift position and the second shift position on a first gearing of the coupling element is carried out on a gearing which is connected in a rotationally fixed manner to the third element of the second planetary gear set; and
wherein the guidance of the coupling element between the second shift position and the third shift position on a second gearing of the coupling element takes place on a gearing which is connected in a rotationally fixed manner to the output shaft.

4. The electric vehicle transmission according to claim 2, wherein the coupling element is assigned an adjusting actuator via which the coupling element can be moved between the first, second, and third shift positions.

5. The electric vehicle transmission according to claim 1, further comprising a differential gear, wherein the output shaft is coupled to the differential gear.

6. The electric vehicle transmission according to claim 1, wherein the first, second, and third planetary gear sets are disposed on a connection point of the input shaft, the connection point configured to couple the input shaft to the electric machine in a sequence of first planetary gear set, second planetary gear set, and third planetary gear set.

7. The electric vehicle transmission according to claim 6, characterized in that the first shift element, the second shift element and the third shift element are disposed axially between the second planetary gear set and the third planetary gear set.

8. The electric vehicle transmission according to claim 1, wherein:
a first gear between the input shaft and the output shaft results by closing the first shift element;
a second gear between the input shaft and the output shaft results by actuating the second shift element; and a third gear between the input shaft and the output shaft results by closing the third shift element.

9. A drive system for an electric vehicle, comprising:
an electric machine having a rotor; and
an electric vehicle transmission according to claim 1;
wherein the rotor is coupled to the input shaft of the electric vehicle transmission.

10. The drive system according to claim 9, wherein the first planetary gear set of the electric vehicle transmission axially overlaps and is positioned radially inward of the electric machine.

11. A vehicle drive train comprising the drive system according to claim 9.

12. The vehicle drive train according to claim 11, wherein the drive system is oriented parallel to a drive axle, and wherein the output shaft of the electric vehicle transmission is coupled to output shafts of the drive axle.

13. An electric vehicle, comprising a vehicle drive train according to claim 12.

14. The electric vehicle of claim 13, wherein the electric vehicle is configured as a commercial vehicle.

* * * * *